(12) United States Patent
Singer

(10) Patent No.: US 11,073,603 B2
(45) Date of Patent: Jul. 27, 2021

(54) CONTROLLED SCAN PATTERN TRANSITION IN COHERENT LIDAR

(71) Applicant: GM Global Technology Operations LLC, Detroit, MI (US)

(72) Inventor: Scott Singer, San Gabriel, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 705 days.

(21) Appl. No.: 15/944,209

(22) Filed: Apr. 3, 2018

(65) Prior Publication Data

US 2019/0302237 A1 Oct. 3, 2019

(51) Int. Cl.
| | |
|---|---|
| *G01S 7/481* | (2006.01) |
| *G01S 17/46* | (2006.01) |
| *G01S 7/48* | (2006.01) |
| *G01S 17/58* | (2006.01) |
| *G02F 1/29* | (2006.01) |
| *G01S 17/931* | (2020.01) |

(52) U.S. Cl.
CPC .......... *G01S 7/4817* (2013.01); *G01S 7/4808* (2013.01); *G01S 17/46* (2013.01); *G01S 17/58* (2013.01); *G01S 17/931* (2020.01); *G02F 1/292* (2013.01); *G02F 2203/24* (2013.01)

(58) Field of Classification Search
None
See application file for complete search history.

(56) References Cited

U.S. PATENT DOCUMENTS

| | | | | |
|---|---|---|---|---|
| 5,638,164 A | * | 6/1997 | Landau | G01S 7/4802 356/5.01 |
| 6,256,038 B1 | * | 7/2001 | Krishnamurthy | G06T 11/203 345/419 |
| 2005/0219250 A1 | * | 10/2005 | Sepulveda | G06T 13/40 345/473 |
| 2006/0202038 A1 | * | 9/2006 | Wang | G06K 7/10811 235/462.24 |
| 2007/0090180 A1 | * | 4/2007 | Griffis | G06Q 10/06 235/376 |
| 2010/0002908 A1 | * | 1/2010 | Miyamoto | G06T 7/215 382/103 |
| 2011/0274161 A1 | * | 11/2011 | Park | H04N 19/176 375/240.03 |
| 2013/0329038 A1 | * | 12/2013 | Hager | G06T 7/70 348/113 |
| 2014/0010409 A1 | * | 1/2014 | Yamashita | G06K 9/00342 382/103 |
| 2015/0292874 A1 | * | 10/2015 | Shpunt | H04N 13/271 345/420 |
| 2016/0282468 A1 | * | 9/2016 | Gruver | G01S 7/4808 |

* cited by examiner

*Primary Examiner* — Yuqing Xiao
*Assistant Examiner* — Amir J Askarian
(74) *Attorney, Agent, or Firm* — Cantor Colburn LLP

(57) ABSTRACT

A coherent lidar system, a method of operating the coherent lidar system and a vehicle including the coherent lidar system involve a beam steering device to direct output light from the system within a field of view. A first series of positions of the beam steering device defines a first scan pattern within the field of view and a second series of positions of the beam steering device defines a second scan pattern within the field of view. The coherent lidar system includes a controller to provide transition positions to the beam steering device to transition the beam steering device from the first scan pattern to the second scan pattern. The transition positions follow a basis spline (B-spline) function.

14 Claims, 7 Drawing Sheets

CONTROLLED SCAN PATTERN TRANSITION IN COHERENT LIDAR

INTRODUCTION

The subject disclosure relates to controlled scan pattern transition in a coherent lidar system.

Vehicles (e.g., automobiles, trucks, construction equipment, farm equipment, automated factory equipment) increasingly include sensors that obtain information about the vehicle operation and the environment around the vehicle. Some sensors, such as cameras, radio detection and ranging (radar) systems, and light detection and ranging (lidar) systems can detect and track objects in the vicinity of the vehicle. A coherent lidar system transmits frequency modulated continuous wave (FMCW) light and processes reflected beams to determine information about the target. By determining the relative location and heading of objects around the vehicle, vehicle operation may be augmented or automated to improve safety and performance. For example, sensor information may be used to issue alerts to the driver of the vehicle or to operate vehicle systems (e.g., collision avoidance systems, adaptive cruise control system, autonomous driving system). Sensors like the radar system and the lidar system may perform a scan over a given field of view. In the case of the lidar system, a beam steering device may be used to direct the light beam, one transmission at a time, in a pattern that represents a coarse scan over the field of view. If a target is detected during that coarse scan, the lidar system may then reduce the area over which a finer scan is performed. Accordingly, it is desirable to provide controlled scan pattern transition in a coherent lidar system

SUMMARY

In one exemplary embodiment, a coherent lidar system includes a beam steering device to direct output light from the system within a field of view. A first series of positions of the beam steering device defines a first scan pattern within the field of view and a second series of positions of the beam steering device defines a second scan pattern within the field of view. The system also includes a controller to provide transition positions to the beam steering device to transition the beam steering device from the first scan pattern to the second scan pattern. The transition positions follow a basis spline (B-spline) function.

In addition to one or more of the features described herein, the controller determines the transition positions based on determining a number of segments N of the B-spline.

In addition to one or more of the features described herein, the controller determines the number of segments N by minimizing a value of N without a velocity of the beam steering device exceeding a maximum value based on the velocity increasing as the value of N decreases.

In addition to one or more of the features described herein, the controller calculates the B-spline function based on determining a number of knots. The number of knots indicates a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}\,'$ and velocity vector $\vec{v}\,'$.

In addition to one or more of the features described herein, the controller determines whether the number of knots is one or two based on whether the velocity vector $\vec{v}$ and the velocity vector $\vec{v}\,'$ are parallel and based on scalar parameters u and u' that are solved based on the position vector $\vec{r}$, the velocity vector $\vec{v}$, the position vector $\vec{r}\,'$, and the velocity vector $\vec{v}\,'$.

In addition to one or more of the features described herein, the controller determines that the number of knots is one based on the velocity vector $\vec{v}$ and the velocity vector $\vec{v}\,'$ being parallel and a dot product of the velocity vector $\vec{v}$ and the velocity vector $\vec{v}\,'$ being negative or based on the velocity vector $\vec{v}$ and the velocity vector $\vec{v}\,'$ not being parallel and sign functions of u and u' being unequal.

In addition to one or more of the features described herein, the controller determines that the number of knots is two based on the velocity vector $\vec{v}$ and the velocity vector $\vec{v}\,'$ being parallel and a dot product of the velocity vector $\vec{v}$ and the velocity vector $\vec{v}\,'$ being non-negative or based on the velocity vector $\vec{v}$ and the velocity vector $\vec{v}\,'$ not being parallel and sign functions of u and u' being equal.

In addition to one or more of the features described herein, the controller determines the second scan pattern based on a detection of a target in the first scan pattern.

In addition to one or more of the features described herein, the system is a monostatic system or a bistatic system.

In addition to one or more of the features described herein, the system is included on or within a vehicle and detects a location and speed of an object relative to the vehicle.

In another exemplary embodiment, a method of operating a coherent lidar system includes adjusting a beam steering device to direct output light from the system within a field of view. The adjusting the beam steering device to a first series of positions defines a first scan pattern within the field of view and adjusting the beam steering device to a second series of positions defines a second scan pattern within the field of view. The method also includes providing transition positions to the beam steering device to transition the beam steering device from the first scan pattern to the second scan pattern. The transition positions follow a basis spline (B-spline) function.

In addition to one or more of the features described herein, the method also includes determining the transition positions based on determining a number of segments N of the B-spline.

In addition to one or more of the features described herein, the determining the number of segments is based on minimizing a value of N without a velocity of the beam steering device exceeding a maximum value based on the velocity increasing as the value of N decreases.

In addition to one or more of the features described herein, the method also includes calculating the B-spline function based on determining a number of knots, the number of knots indicating a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}\,'$ and velocity vector $\vec{v}\,'$.

In addition to one or more of the features described herein, the method also includes determining whether the number of knots is one or two based on determining whether the velocity vector $\vec{v}$ and the velocity vector $\vec{v}'$ are parallel and based on determining scalar parameters u and u' that are solved based on the position vector $\vec{r}$, the velocity vector $\vec{v}$, the position vector $\vec{r}$, and the velocity vector $\vec{v}'$.

In yet another exemplary embodiment, a vehicle includes a coherent lidar system that includes a beam steering device to direct output light from the system within a field of view. The first series of positions of the beam steering device defines a first scan pattern within the field of view and a second series of positions of the beam steering device defines a second scan pattern within the field of view. The coherent lidar system also includes a controller to provide transition positions to the beam steering device to transition the beam steering device from the first scan pattern to the second scan pattern. The transition positions follow a basis spline (B-spline) function. The vehicle also includes a vehicle controller to augment or automate operation of the vehicle based on information obtained from the coherent lidar system.

In addition to one or more of the features described herein, the controller determines the transition positions based on determining a number of segments N of the B-spline.

In addition to one or more of the features described herein, the controller determines the number of segments N by minimizing a value of N without a velocity of the beam steering device exceeding a maximum value based on the velocity increasing as the value of N decreases.

In addition to one or more of the features described herein, the controller calculates the B-spline function based on determining a number of knots, the number of knots indicating a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}'$ and velocity vector $\vec{v}'$.

In addition to one or more of the features described herein, the controller determines whether the number of knots is one or two based on whether the velocity vector $\vec{v}$ and the velocity vector $\vec{v}'$ are parallel and based on scalar parameters u and u' that are solved based on the position vector $\vec{r}$, the velocity vector $\vec{v}$, the position vector $\vec{r}'$, and the velocity vector $\vec{v}'$.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
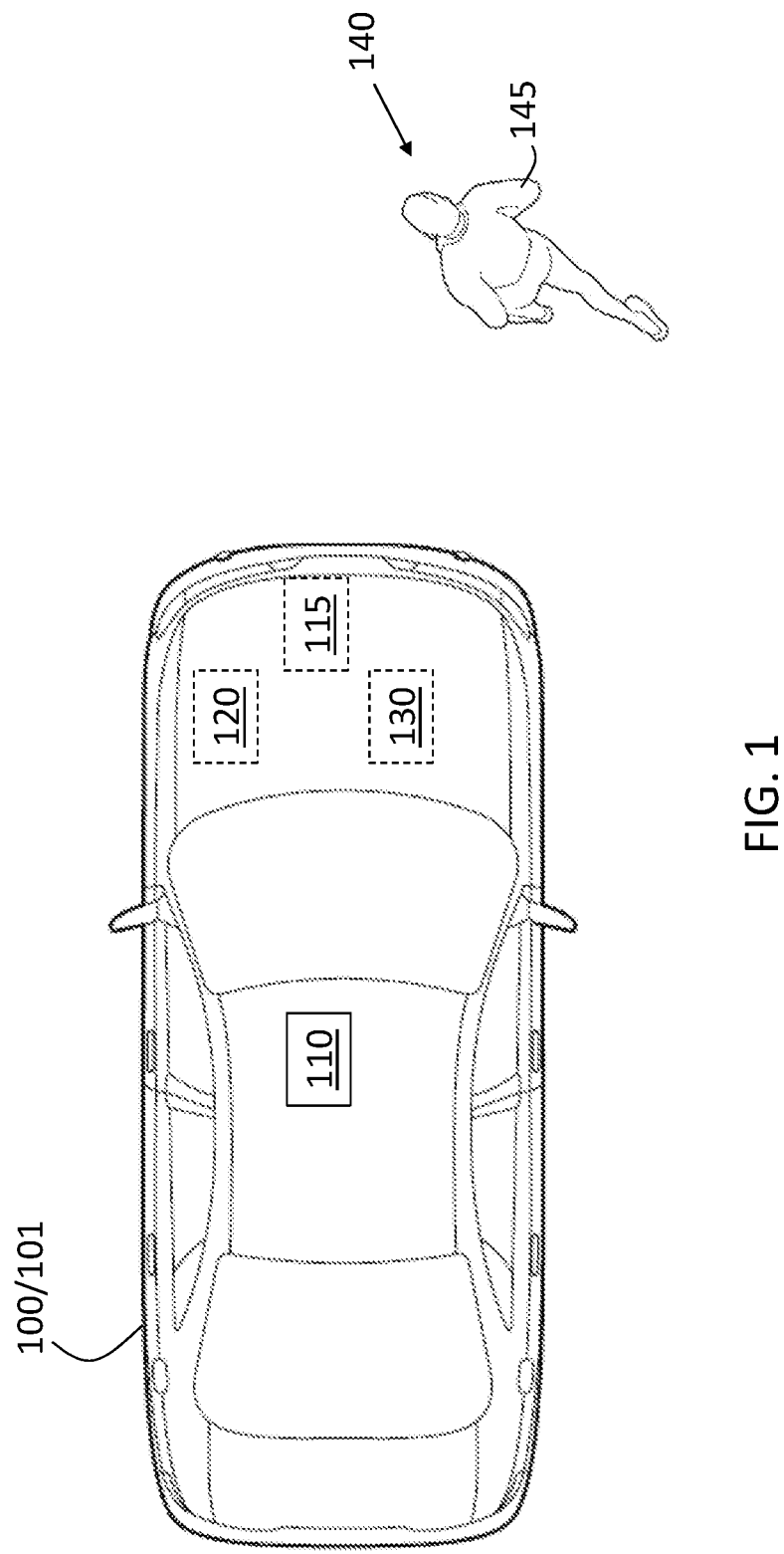
FIG. 1 is a block diagram of a scenario involving a coherent lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, sensors may be used to augment vehicle operation or to operate an autonomous vehicle. As also noted, one type of sensor is a coherent lidar system that transmits an FMCW signal. The system takes advantage of phase coherence between the transmitted FMCW signal and a reflected signal resulting from reflection of the transmitted FMCW signal by a target. The interference between the reflected signal and a copy of the transmitted signal is used to determine information such as target distance and speed. The coherent lidar system differs from prior time-of-flight lidar systems that transmit a series of pulses and use the duration for transmission of each pulse and reception of the resulting reflection to determine a set of distances for the target. The coherent lidar system may perform a coarse scan over a field of view and then perform a finer scan over a more limited area based on identifying a target during the coarse scan, for example.

A beam steering device facilitates the scan by focusing light in a specified area. In many scenarios, it may be advantageous to reduce the field of view of a sensor from a wide one, covered by a coarse scan, to a smaller one, covered by a fine scan, in order to increase the sensor's resolution. The transition of the beam steering device from the end of a coarse scan to a starting point of the area for a fine scan can result in ringing or oscillations of the mirror if the transition is done too quickly. However, too slow a transition may result in the target moving out of the area determined for the finer scan before the scan is started. Embodiments of the systems and methods detailed herein relate to controlled scan pattern transition in a coherent lidar system. Specifically, a trajectory is determined to transition the beam steering device from the coarse scan to the fine scan.

Figure 2:
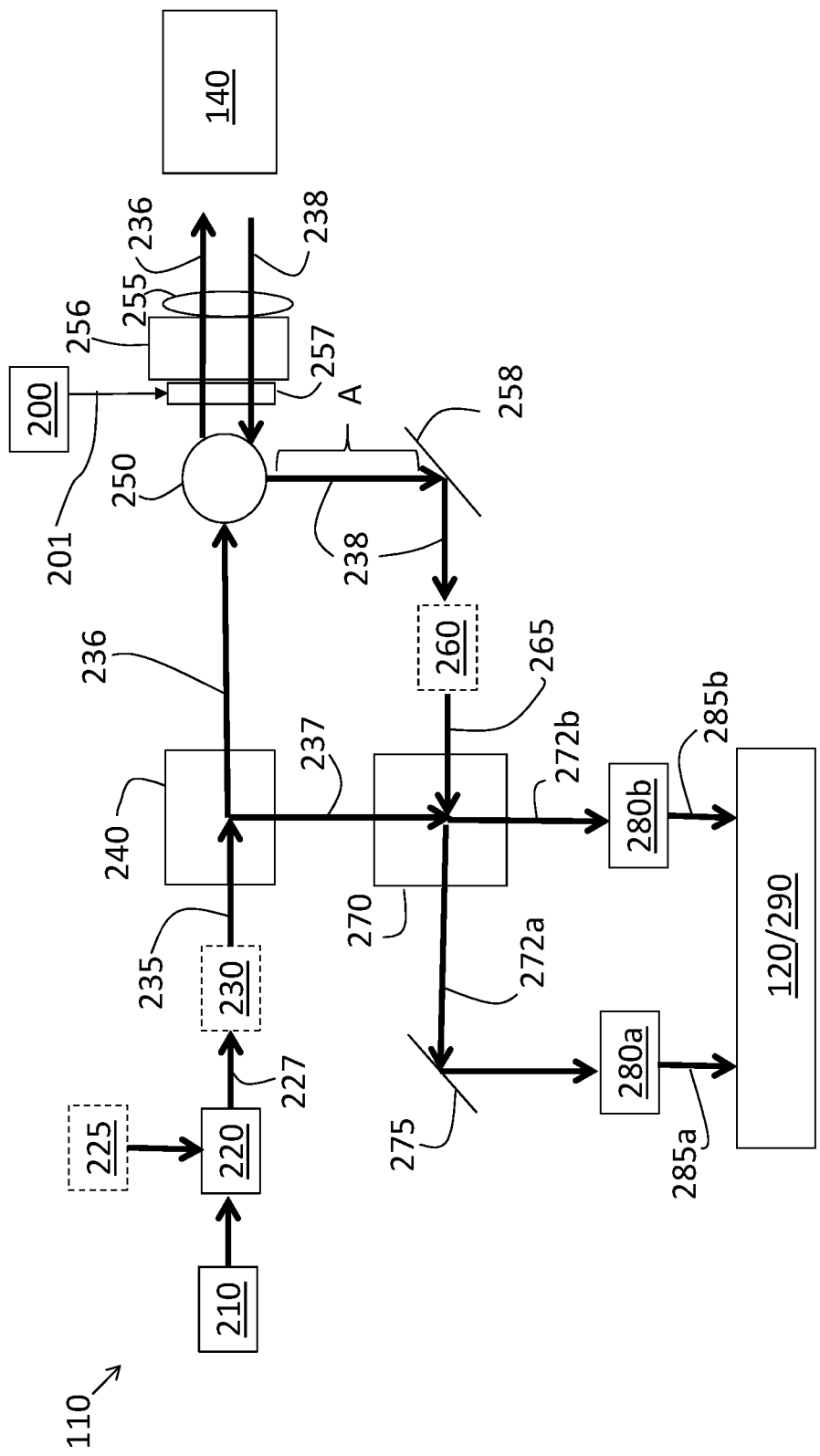
FIG. 2 is a block diagram of a coherent lidar system with a controlled scan pattern transition according to one or more embodiments.
Figure 4:
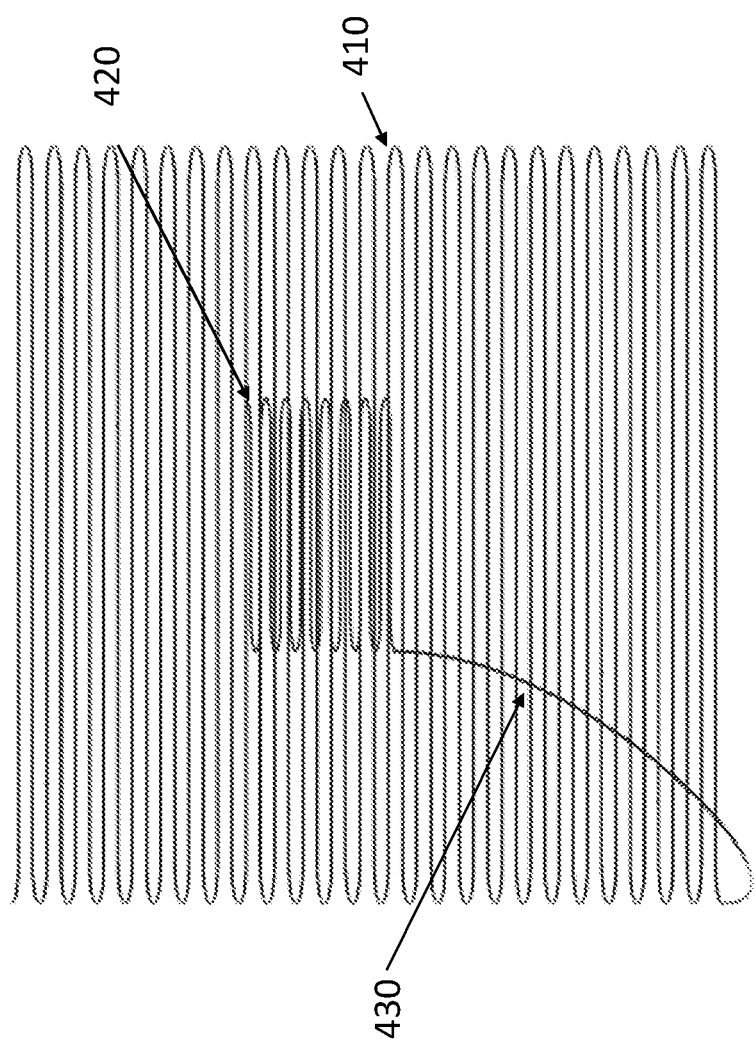
FIG. 4 shows an exemplary coarse scan and an exemplary fine scan facilitated by controlled scan pattern transition according to alternate one or more embodiments.

In accordance with an exemplary embodiment, FIG. 1 is a block diagram of a scenario involving a coherent lidar system 110 with a controlled scan pattern transition 430 (FIG. 4). The vehicle 100 shown in FIG. 1 is an automobile 101. A coherent lidar system 110, further detailed with reference to FIG. 2, is shown on the roof of the automobile 101. According to alternate or additional embodiments, one or more lidar systems 110 may be located elsewhere on the vehicle 100. Another sensor 115 (e.g., camera, microphone, radar system) is shown, as well. Information obtained by the lidar system 110 and one or more other sensors 115 may be provided to a controller 120 (e.g., electronic control unit (ECU)).

The controller 120 may use the information to control one or more vehicle systems 130. In an exemplary embodiment, the vehicle 100 may be an autonomous vehicle and the controller 120 may perform known vehicle operational control using information from the lidar system 110 and other sources. In alternate embodiments, the controller 120 may augment vehicle operation using information from the lidar system 110 and other sources as part of a known system (e.g., collision avoidance system, adaptive cruise control system). The lidar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 is a block diagram of a coherent lidar system 110 with a controlled scan pattern transition 430 according to one or more embodiments. The exemplary lidar system 110 shown in FIG. 2 is a monostatic system that uses the same path for light output from the lidar system 110 as an output signal 236 and light obtained by the lidar system 110 as a receive beam 238. The lidar system 110 includes a light source 210. The light source 210 may be a laser diode such as a distributed feedback (DFB) laser according to an exemplary embodiment. The light source 210 outputs a continuous wave of light, which exhibits a constant amplitude. The next stage in the light output system includes an optical resonator 220.

The resonator 220 is an external optical cavity, external to the light source 210 and, according to the exemplary embodiment shown in FIG. 2, a controlled voltage 225 using a voltage source is applied to the resonator 220 to perform electro-optical modulation and modulate the frequency of the continuous wave of light in the resonator 220 to produce FMCW light 227. According to the exemplary embodiment, the feedback of some light from the resonator 220 to the light source 210 means that the light generated within the light source 210 and the light output by the resonator 220 are modulated synchronously. The controlled voltage 225 may be increased or decreased linearly in order to produce light that exhibits linear frequency modulation (i.e., a linear FMCW signal). Alternately, the controlled voltage 225 may be varied non-linearly to produce light that exhibits non-linear frequency modulation.

According to alternate embodiments, the FMCW light 227 may be obtained by modulating the frequency at the light source 210 itself. In this case, the controlled voltage 225 applied to the resonator 220, as shown in FIG. 2, may be applied directly to block 210. For example, the bias current of the laser chip may be changed or a physical cavity or mirror of the light source 210 may be modulated. This modulation may be implemented by piezoelectric or microelectromechanical systems (MEMS) actuation, for example. As FIG. 2 indicates, an optional optical amplifier 230 may be used to amplify the FMCW light 227 output by the resonator 220 to produce the FMCW signal 235.

A beam splitter 240 is used to split the FMCW signal 235 into an output signal 236 and a local oscillator (LO) signal 237. Both the output signal 236 and the LO signal 237 exhibit the frequency modulation imparted by the controlled voltage 225, or other modulator. The beam splitter 240 may be an on-chip waveguide splitter, for example. The output signal 236 is provided to a light circulating element, a circulator 250, which is necessary in the monostatic system shown in FIG. 2. The circulator 250 directs the output signal 236 out of the lidar system 110 through an aperture lens 255 (e.g., a monocentric lens like a ball lens).

A beam steering device 257 ensures proper alignment of the output signal 236 exiting the lidar system 110 and proper alignment of the receive beam 238 that enters the lidar system 110 and must be properly aligned for ultimate interference at the photodiodes 280. The beam steering device 257 may be a reflector. According to the exemplary embodiment shown in FIG. 2, the beam steering device 257 is a two-dimensional MEMS scanning mirror. In alternate embodiments, the beam steering device 257, which performs two-dimensional beam steering, may be a mirror galvanometer, Risley prism pairs, an optical phased array, or liquid crystal beam steering device. Control of this beam steering device 257, as further discussed with reference to FIGS. 4 and 5, facilitates the controlled scan pattern transition 430 according to one or more embodiments.

A beam steering controller 200 is shown in FIG. 2 and provides a beam steering control signal 201 to the beam steering device 257. In alternate embodiments, the controller 120 may perform this function and send the beam steering control signal 201 from outside the lidar system 110. Like the controller 120, the beam steering controller 200 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A light conveyer 256 (e.g., fiber taper bundle, micro lens array and static mirror) conveys light between the beam steering device 257 and the aperture lens 255. If a target 140 is in the field of view of the lidar system 110, as in the example shown in FIG. 2, the FMCW output signal 236 output from the lidar system 110 is scattered by the target 140. Some of that scattered light reenters the lidar system 110 as a receive beam 238. The receive beam 238 enters the aperture lens 255, is conveyed by the light conveyer 256 to the beam steering device 257, and is directed by the circulator 250 to a reflector 258. The reflector 258 directs the receive beam 238 to an optional optical amplifier 260, according to one or more embodiments.

While the optical amplifier 260 is shown between the reflector 258 and an alignment element 270 in FIG. 2, the optical amplifier 260 may instead be located between the circulator 250 and the reflector 258, along the path indicated as "A." According to exemplary embodiments, the optical amplifier 260 may include coupling lenses to direct the receive beam 238 into the optical amplifier 260 without loss. The optical amplifier 260 may also include shaping optics to ensure that the amplified receive beam 265 provided by the optical amplifier 260 has the correct profile.

The amplified receive beam 265 is provided to the alignment element 270 in which with the amplified receive beam 265 is aligned with the LO signal 237. The alignment element 270 ensures that the amplified receive beam 265 and the LO signal 237 are co-linear and splits the output into two co-linear signals 272a, 272b (generally referred to as 272). The co-linear signals 272a, 272b are respectively directed to photodetectors 280a, 280b (generally referred to as 280). As FIG. 2 indicates, one of the co-linear signal 272a is reflected by a reflector 275 in order to be directed into the corresponding photodetector 280a. The amplified receive beam 265 and LO signal 237, which are aligned in the co-linear signal 272, interfere with each other in the photodetectors 280. The interference between the amplified receive beam 265 and the LO signal 237 results in a coherent combination of the two beams. Thus, the lidar system 110 is referred to as a coherent lidar system, unlike the time-of-flight systems. The interference in each photodetector 280 is effectively like performing an autocorrelation function to identify an amplified receive beam 265 that resulted from the output signal 236. This prevents errant light from another light source outside the lidar system 110, which is within the field of view of the lidar system 110, from being mistaken for a receive beam 238 that is reflected by a target 140.

The photodetectors 280 are semiconductor devices that convert the result of the interference between the amplified receive beam 265 and the LO signal 237 in each co-linear signal 272 into electrical currents 285a, 285b (generally referred to as 285). Two photodetectors 280 are used in accordance with a known balanced detector technique to cancel noise that is common to both photodetectors 280. The electrical currents 285 from each of the photodetectors 280 are combined and processed to obtain information such as range to the target 140, speed of the target 140, and other information according to known processing techniques. The processing may be performed within the lidar system 110 by a processor 290 or outside the lidar system 110 by the controller 120, for example. The processor 290 may include processing circuitry similar to that discussed for the controller 120.

Figure 3:
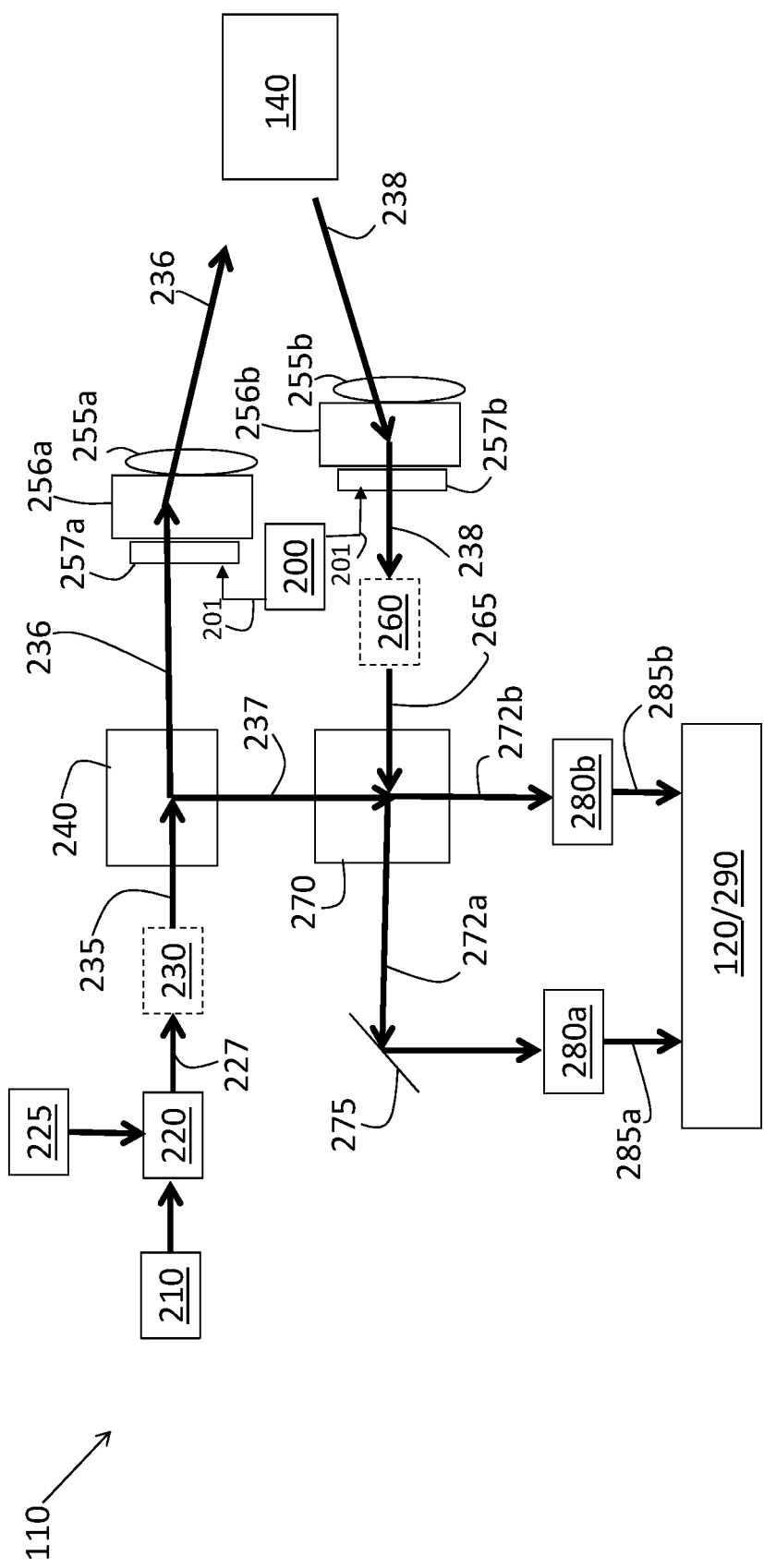
FIG. 3 is a block diagram of a coherent lidar system with controlled scan pattern transition according to alternate one or more embodiments.

FIG. 3 is a block diagram of a coherent lidar system 110 with controlled scan pattern transition 430 according to alternate one or more embodiments. A bistatic lidar system 110 is shown in the exemplary embodiment of FIG. 3. Most of the bistatic lidar system 110, shown in FIG. 3, is identical to the monostatic lidar system 110, shown in FIG. 2. Thus, the components detailed with reference to FIG. 2 are not discussed again. As previously noted, the primary difference between the monostatic and bistatic systems is in the inclusion, in the bistatic system, of separate aperture lenses 255a, 255b (generally referred to as 255), light conveyers 256a, 256b (generally referred to as 256), and beam steering devices 257a, 257b (generally referred to as 257) for the output signal 236 and receive beam 238. As such a circulator 250 is not needed in the bistatic system of FIG. 3.

FIG. 4 shows an exemplary coarse scan 410 and an exemplary fine scan 420 facilitated by controlled scan pattern transition 430 according to alternate one or more embodiments. The transition 430 and the fine scan 420 may be determined by the beam steering controller 200 or another controller 120 in the vehicle 100. The transition 430 may be initiated based on the detection of a target 140 during the coarse scan 410, for example, such that the fine scan 420 covers a narrow field of view defined by the position of the detected target 140. Although the example shown in FIG. 4 is from a coarse scan 410 to a fine scan 420, the transition 430 is not limited to be between any particular scan type or between relatively broader or narrower scans. For example, the transition 430 may be between two coarse scans 410 that each cover a different part of the overall field of view.

The transition 430 is implemented as a basis spline (B-spline) according to an exemplary embodiment. The B-spline that defines the transition 430 is a vector function $\vec{f}$ (t) that satisfies the following boundary condition:

$$\vec{f}_{(0)} = \vec{r} \quad [EQ. 1]$$

According to EQ. 1, at time t=0, the beginning of the transition 430, the initial position of the beam steering device 257 is $\vec{r}$. The position vector $\vec{r}$, provides a position direction relative to an origin. Generally the origin is the center of the overall field of view of the lidar system 110, which may correspond with the default position of the beam steering device 257. Another boundary condition that the vector function $\vec{f}$ (t) must satisfy is:

$$\vec{f}_{(T)} = \vec{r}\,' \quad [EQ. 2]$$

At time t=T, at the end of the transition 430, the final position of the beam steering device 257, which is the initial position to begin the fine scan 420, is given by $\vec{r}\,'$. A third boundary condition is given by:

$$\left.\frac{d\vec{f}}{dt}\right|_{t=0} = \frac{d\vec{r}}{dt} = \vec{v} \quad [EQ. 3]$$

In EQ. 3, $\vec{v}$ is the instantaneous velocity at which the beam steering device 257 is moving at the end of the coarse scan 410. The final boundary condition is given by:

$$\left.\frac{d\vec{f}}{dt}\right|_{t=T} = \frac{d\vec{r}\,'}{dt} = \vec{v}\,' \quad [EQ. 4]$$

In EQ. 4, $\vec{v}\,'$ is the instantaneous velocity at which the beam steering device 257 is moving at the beginning of the fine scan 420.

Additional conditions that are used to solve for the B-spline defining the transition 430 include the following:

$$|\vec{f}| < \vec{r}_{max} \text{ for all } 0 < t < T \quad [EQ. 5]$$

$$\frac{d\vec{f}}{dt} < \vec{v}_{max} \text{ for all } 0 < t < T \quad [EQ. 6]$$

According to EQ. 5, the vector function $\vec{f}$ (t) cannot have a position direction relative to the origin that requires the beam steering device 257 to exceed its maximum steering position during the transition 430. For example, when the beam steering device 257 is a MEMS scanning mirror, the transition 430 cannot require the maximum tilt angle of the mirror to be exceeded. According to EQ. 6, a maximum velocity cannot be exceeded during the transition 430.

Figure 5A:
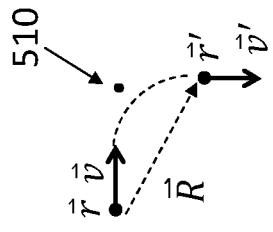
FIGS. 5A-5F illustrates different scenarios for the initial position vector $\vec{r}$ and final position vector $\vec{r}'$ to describe additional processes in the determination of the transition according to embodiments.

FIGS. 5A-5F illustrates different scenarios for the initial position vector $\vec{r}$, final position vector $\vec{r}\,'$, initial velocity vector $\vec{v}$, and final velocity vector $\vec{v}\,'$ to describe additional processes in the determination of the transition 430 according to embodiments. Specifically, the scenarios illustrate the determination of whether one or two knots 510 are required. Knots 510 are breakpoints or places where the piecewise polynomial functions that make up the B-spline function meet. FIG. 5A indicates that the initial velocity vector $\vec{v}$ and final velocity vector $\vec{v}\,'$ are parallel relative to the origin but directed in opposite directions. Generally, a comparison of FIGS. 5A and 5B indicates that the parallel velocity vectors $\vec{v}$ and $\vec{v}\,'$ moving in the same direction, as in FIG. 5B, result in two changes of direction or two knots 510 being needed, while the parallel velocity vectors $\vec{v}$ and $\vec{v}'$ moving in opposite directions, as in FIG. 5A, results in one change of direction or one knot 510 being needed. A comparison of FIGS. 5C, 5D, 5E, and 5F indicates that the perpendicular velocity vectors $\vec{v}$ and $\vec{v}'$ moving away from each other, as in FIGS. 5C and 5E, result in one change of direction or one knot 510 being needed, while the perpendicular velocity vectors $\vec{v}$ and $\vec{v}'$ moving toward from each other, as in FIGS. 5D and 5F, result in two changes of direction or two knots 510 being needed. These observations are used in the determination of the number of knots 510, as discussed with reference to FIG. 7.

Figure 6:
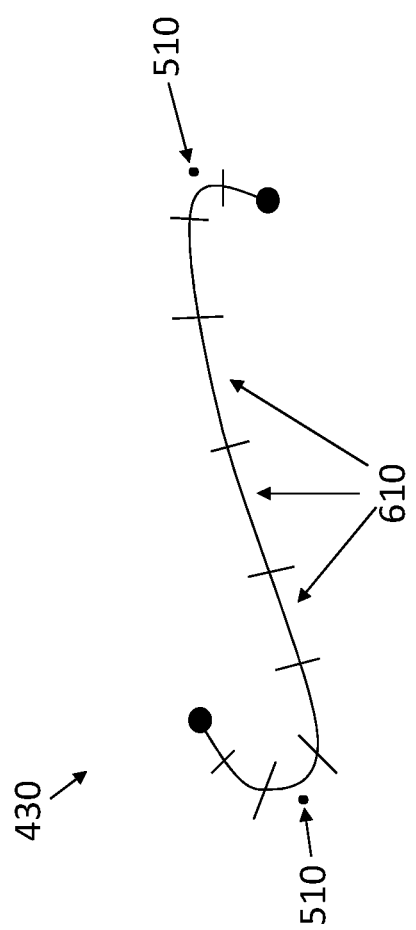
FIG. 6 shows an exemplary transition determined according to one or more embodiments.

FIG. 6 shows an exemplary transition 430 determined according to one or more embodiments. The exemplary transition 430 shown in FIG. 6 includes two knots 510. Given the boundary conditions and other conditions discussed with reference to EQS. 1 through 6, and also based on determining whether one or two knots 510 are needed for the transition 430, the number of equal-time segments 610 is determined for the transition 430. Specifically, the end points of each segment 610 indicate positions corresponding with the beam steering device 257, and equal-time segments 610 refers to the fact that each segment 610 may not represent the same distance but does represent the same duration for the beam steering device 257 to change positions. In alternate embodiments, the segments 610 may not be equal-time segments.

In FIG. 6, 10 segments 610 (N=10) are shown for the B-spline that defines the transition 430. The determination of the number N of segments 610 is based on the fact that the velocity of the beam steering device 257, in transitioning from segment 610 to segment 610, decreases as the number N of the segments 610 increases. Stated another way, the duration T of the transition 430 increases as the number N of the segments 610 increases. Because the goal is to minimize the duration T of the transition 430, the number N of the segments 610 should be minimized. At the same time, the number N of the segments 610 cannot be selected to be so low that the instantaneous velocity at any point along the B-spline, which increases as N decreases, exceeds the maximum velocity, $\vec{v}_{max}$.

Figure 7:
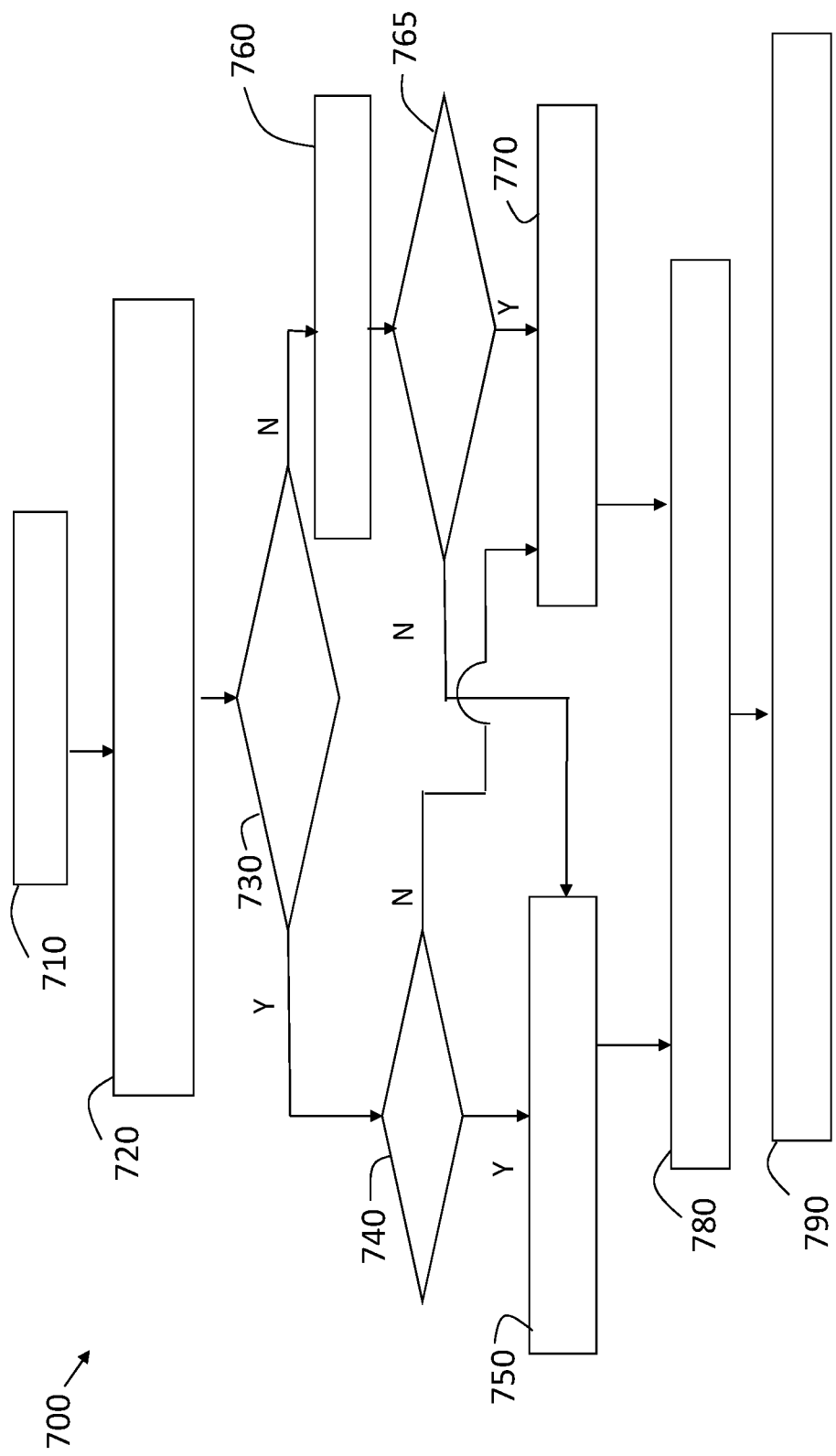
FIG. 7 is a process flow of a method of performing a controlled scan pattern transition with the beam steering device of a coherent lidar system according to one or more embodiments.

FIG. 7 is a process flow 700 of a method of performing a controlled scan pattern transition 430 with the beam steering device 257 according to one or more embodiments. The processes discussed with reference to FIG. 7 may be performed by the beam steering controller 200 or another controller 120 in the vehicle 100 according to exemplary embodiments. At block 710, receiving a new scan pattern includes receiving the pattern of the fine scan 420, according to the exemplary case shown in FIG. 4. Determining the last position and velocity of the current scan and the start position and velocity of the new scan, at block 720, refers to obtaining $\vec{r}$, $\vec{v}$ $\vec{r}'$, and $\vec{v}'$, respectively.

At block 730, a check is done of whether the velocity vectors $\vec{v}$ and $\vec{v}'$ are parallel. This is the case for the scenarios shown in FIGS. 5A and 5B. If the velocity vectors are parallel, the process at block 740 is performed. At block 740, a check is done of whether a dot product of the velocity vectors $\vec{v}$ and $\vec{v}'$ is negative. If the dot product of the velocity vectors $\vec{v}$ and $\vec{v}'$ is negative according to the check at block 740, then calculating the B-spline with one knot 510, at block 750, is performed, as is the case of FIG. 5A.

Figure 5B:
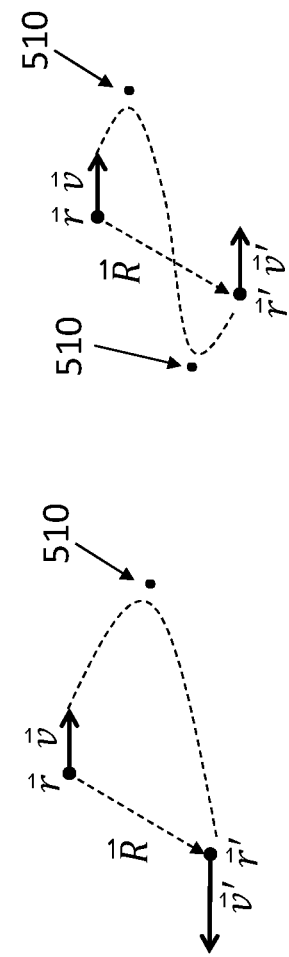
Figure 5C:
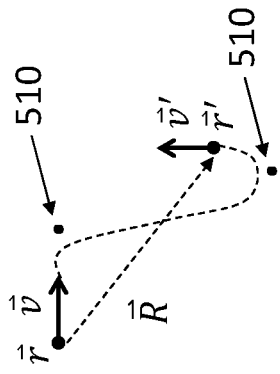
Figure 5D:
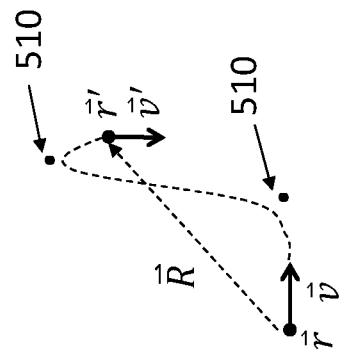
Figure 5E:
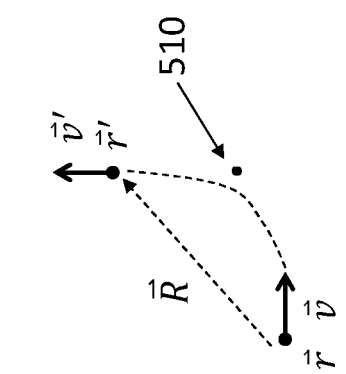
Figure 5F:
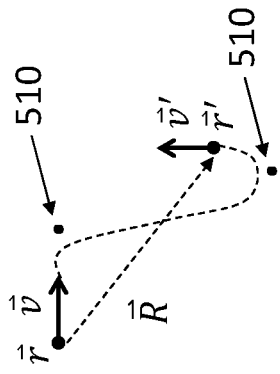

If the dot product of the velocity vectors $\vec{v}$ and $\vec{v}'$ is not negative, according to the check at block 740, then calculating the B-spline with two knots 510, at block 770, is performed, as is the case of FIG. 5B.

If the velocity vectors $\vec{v}$ and $\vec{v}'$ are not parallel, according to the check at block 730, then the process at block 760 is performed. At block 760, the following vector equation is solved to determine scalar parameters u and u', which represent, respectively, relative time coordinates for the trajectory with v originating at r and the trajectory with v' originating at r':

$$\vec{r} + \vec{v}u = \vec{r}' + \vec{v}'u' \quad [\text{EQ. 7}]$$

The position and velocity vectors are two-dimensional vectors. Thus, the position vector, $\vec{r}$ may be defined as $\vec{r} = \langle r_1, r_2 \rangle$, for the position vector $\vec{r}'$ may be defined as $\vec{r}' = \langle r_1', r_2' \rangle$, velocity vector $\vec{v}$ may be defined as $\vec{v} = \langle v_1, v_2 \rangle$, and velocity vector $\vec{v}'$ may be defined as $\langle '= \rangle v_1', v_2' \langle$. In the exemplary embodiment, this coordinate decomposition is performed in a spherical angle space, with the $r_1$ coordinate representing angle in azimuth ($\phi$) and the $r_2$ coordinate representing angle in elevation ($\theta$). In alternate embodiments, the coordinate decomposition may be performed for any two-dimensional basis, such as Cartesian or polar coordinates, with $r_1$ representing the coordinate along the first basis vector and $r_2$ the coordinate along the second basis vector. Thus, EQ. 7 represents a system of two linear equations which may be solved simultaneously for u and u', with the closed-form solution:

$$u = \frac{v_1'(r_2' - r_2) + v_2'(r_1 - r_1')}{v_2 v_1' - v_1 v_2'}, \quad [\text{EQ. 8}]$$

$$u' = \frac{v_1(r_2' - r_2) + v_2(r_1 - r_1')}{v_2 v_1' - v_1 v_2'} \quad [\text{EQ. 9}]$$

The check, at block 730, of whether the velocity vectors $\vec{v}$ and $\vec{v}'$ are parallel accounts for the case in which EQ. 7 is degenerate (i.e. there is no solution for u and u', which occurs when $v_2 v_1' = v_1 v_2'$).

A check is then done, at block 765, of whether the sign function of u and u' are equal. If they are equal, according to the check at block 765, then calculating the B-spline with two knots 510, at block 770, is performed, as is the case of FIGS. 5D and 5F. If the sign functions of u and u' are not equal, according to the check at block 765, then calculating the B-spline with one knot 510, at block 750, is performed, as is the case of FIGS. 5C and 5E.

At block 780, determining the number N of segments 610 is performed based on the trade-off between the number of segments N and the velocity of the beam steering device 257 during the transition 430, as discussed with reference to FIG. 6. Once the number N of segments 610 is determined, the process at block 780 also includes segmenting the B-spline that was calculated either at block 750 or at block 770. At block 790, determining the beam steering device 257 positions in order to traverse the B-spline segments 610 results in the beam steering controller 200 or another controller 120 moving the beam steering device 257 through the transition 430 to the new scan pattern.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A coherent lidar system, comprising:
a beam steering device configured to direct output light from the system within a field of view, wherein a first series of positions of the beam steering device defines a first scan pattern within the field of view and a second series of positions of the beam steering device defines a second scan pattern within the field of view; and
a controller configured to provide transition positions to the beam steering device to transition the beam steering device from the first scan pattern to the second scan pattern, wherein the transition positions follow a basis spline (B-spline) function, and the controller is further configured to determine the transition positions based on determining a number of segments N of the B-spline by minimizing a value of N without a velocity of the beam steering device exceeding a maximum value based on the velocity increasing as the value of N decreases.

2. The system according to claim 1, wherein the controller is further configured to calculate the B-spline function based on determining a number of knots, the number of knots indicating a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}\,'$ and velocity vector $\vec{v}\,'$.

3. The system according to claim 2, wherein the controller is further configured to determine whether the number of knots is one or two based on whether the velocity vector $\vec{v}$ and the velocity vector $\vec{v}\,'$ are parallel and based on scalar parameters u and u' that are solved based on the position vector $\vec{r}$, the velocity vector $\vec{r}$, the position vector $\vec{r}\,'$, and the velocity vector $\vec{v}\,'$.

4. The system according to claim 3, wherein the controller is further configured to determine that the number of knots is one based on the velocity vector $\vec{v}$ and the velocity vector $\vec{v}\,'$ being parallel and a dot product of the velocity vector $\vec{v}$ and the velocity vector $\vec{v}\,'$ being negative or based on the velocity vector $\vec{v}$ and the velocity vector $\vec{v}\,'$ not being parallel and sign functions of u and u' being unequal.

5. The system according to claim 3, wherein the controller is further configured to determine that the number of knots is two based on the velocity vector $\vec{v}$ and the velocity vector $\vec{v}\,'$ being parallel and a dot product of the velocity vector $\vec{v}$ and the velocity vector $\vec{v}\,'$ being non-negative or based on the velocity vector $\vec{v}$ and the velocity vector $\vec{v}\,'$ not being parallel and sign functions of u and u' being equal.

6. The system according to claim 1, wherein the controller is further configured to determine the second scan pattern based on a detection of a target in the first scan pattern.

7. The system according to claim 1, wherein the system is a monostatic system or a bistatic system.

8. The system according to claim 1, wherein the system is included on or within a vehicle and is configured to detect a location and speed of an object relative to the vehicle.

9. A method of operating a coherent lidar system, the method comprising:
adjusting a beam steering device to direct output light from the system within a field of view, wherein the adjusting the beam steering device to a first series of positions defines a first scan pattern within the field of view and adjusting the beam steering device to a second series of positions defines a second scan pattern within the field of view;
providing transition positions to the beam steering device to transition the beam steering device from the first scan pattern to the second scan pattern, wherein the transition positions follow a basis spline (B-spline) function; and
determining the transition positions based on determining a number of segments N of the B-spline, wherein the determining the number of segments is based on minimizing a value of N without a velocity of the beam steering device exceeding a maximum value based on the velocity increasing as the value of N decreases.

10. The method according to claim 9, further comprising calculating the B-spline function based on determining a number of knots, the number of knots indicating a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}\,'$ and velocity vector $\vec{v}\,'$.

11. The method according to claim 10, further comprising determining whether the number of knots is one or two based on determining whether the velocity vector $\vec{v}$ and the velocity vector $\vec{v}\,'$ are parallel and based on determining scalar parameters u and u' that are solved based on the position vector $\vec{r}$, the velocity vector $\vec{v}$, the position vector $\vec{r}\,'$, and the velocity vector $\vec{v}\,'$.

12. A vehicle, comprising:
a coherent lidar system comprising:
a beam steering device configured to direct output light from the system within a field of view, wherein a first series of positions of the beam steering device defines a first scan pattern within the field of view and a second series of positions of the beam steering device defines a second scan pattern within the field of view; and
a controller configured to provide transition positions to the beam steering device to transition the beam steering device from the first scan pattern to the second scan pattern, wherein the transition positions follow a basis spline (B-spline) function; and
a vehicle controller configured to augment or automate operation of the vehicle based on information obtained from the coherent lidar system, wherein the controller is further configured to determine the transition positions based on determining a number of segments N of the B-spline by minimizing a value of N without a velocity of the beam steering device exceeding a maximum value based on the velocity increasing as the value of N decreases.

13. The vehicle according to claim 12, wherein the controller is further configured to calculate the B-spline function based on determining a number of knots, the number of knots indicating a number of changes of direction required to reach an initial position of the second scan pattern from a final position of the first scan pattern, the first scan pattern ending with a position vector $\vec{r}$ and velocity vector $\vec{v}$ and the second scan pattern starting with a position vector $\vec{r}'$ and velocity vector $\vec{v}'$.

14. The vehicle according to claim 13, wherein the controller is further configured to determine whether the number of knots is one or two based on whether the velocity vector $\vec{v}$ and the velocity vector $\vec{v}'$ are parallel and based on scalar parameters u and u' that are solved based on the position vector $\vec{r}$, the velocity vector $\vec{v}$, the position vector $\vec{r}'$, and the velocity vector $\vec{v}'$.

* * * * *